United States Patent
Kim et al.

(10) Patent No.: US 8,995,462 B2
(45) Date of Patent: Mar. 31, 2015

(54) APPARATUS AND METHOD FOR PERFORMING CONTENTION BASED ACCESS IN MOBILE COMMUNICATION SYSTEM

(75) Inventors: Soeng-hun Kim, Suwon-si (KR); Gert-Jan Van Lieshout, Staines (GB)

(73) Assignee: Samsung Electronics Co., Ltd., Suwon-Si (KR)

( * ) Notice: Subject to any disclaimer, the term of this patent is extended or adjusted under 35 U.S.C. 154(b) by 83 days.

(21) Appl. No.: 13/514,956

(22) PCT Filed: Dec. 10, 2010

(86) PCT No.: PCT/KR2010/008858
§ 371 (c)(1),
(2), (4) Date: Jun. 8, 2012

(87) PCT Pub. No.: WO2011/071341
PCT Pub. Date: Jun. 16, 2011

(65) Prior Publication Data
US 2013/0010712 A1    Jan. 10, 2013

(30) Foreign Application Priority Data
Dec. 10, 2009  (KR) ................. 10-2009-0122762

(51) Int. Cl.
*H04L 12/413* (2006.01)
*H04W 74/08* (2009.01)

(52) U.S. Cl.
CPC ............. *H04L 12/413* (2013.01); *H04W 74/08* (2013.01)
USPC ......... 370/445; 455/450; 455/451; 455/452.1

(58) Field of Classification Search
CPC .......... H04W 76/048; H04W 52/0216; H04W 72/1284
USPC .................. 370/252, 329, 350, 336
See application file for complete search history.

(56) References Cited

U.S. PATENT DOCUMENTS

| | | | |
|---|---|---|---|
| 2009/0316593 A1* | 12/2009 | Wang et al. | 370/252 |
| 2010/0034162 A1* | 2/2010 | Ou et al. | 370/329 |
| 2010/0035581 A1* | 2/2010 | Park et al. | 455/412.1 |
| 2010/0061361 A1* | 3/2010 | Wu | 370/350 |
| 2010/0074231 A1* | 3/2010 | Hsu | 370/336 |
| 2010/0098011 A1* | 4/2010 | Pelletier et al. | 370/329 |

(Continued)

FOREIGN PATENT DOCUMENTS

| | | |
|---|---|---|
| KR | 10-2008-0049596 | 6/2008 |
| WO | WO 2007/091811 A1 | 8/2007 |

OTHER PUBLICATIONS

Dahlman, "3G evolution HSPA and LTE for mobile broadband", §16.4.5, uplink scheduling grant, 2nd ed., 2008.*

(Continued)

*Primary Examiner* — Khaled Kassim
*Assistant Examiner* — Zhaohui Yang

(57) ABSTRACT

Disclosed is a method of performing a contention based access in a UE of a mobile communication system. The method includes: triggering a BSR to an ENB if data to be transmitted to the ENB occurs; and triggering the contention based access if the BSR has been triggered. The method can minimize collision between signals transmitted in the uplink by multiple UEs through contention based transmission resources in a mobile communication system.

18 Claims, 9 Drawing Sheets

(56) References Cited

U.S. PATENT DOCUMENTS

2011/0310997 A1* 12/2011 Ke et al. .......... 375/316
2012/0044880 A1* 2/2012 Sun et al. .......... 370/329

OTHER PUBLICATIONS

International Search Report dated Aug. 29, 2011 in connection with International Patent Application No. PCT/KR2010/008858.

Written Opinion of International Searching Authority dated Aug. 29, 2011 in connection with International Patent Application No. PCT/KR2010/008858.

3GPP, "Evolved Universal Terrestrial Radio Access (E-UTRA); Medium Access Control (MAC) protocol specification," 3GPP TS 36.321 V8.7.0, Sep. 2009 (retrieved from the Internet on Aug. 25, 2011, 47 pages.

* cited by examiner

APPARATUS AND METHOD FOR PERFORMING CONTENTION BASED ACCESS IN MOBILE COMMUNICATION SYSTEM

PRIORITY

The present application claims priority under 35 U.S.C. §365 to International Patent Application No. PCT/KR2010/008858 filed Dec. 10, 2010, entitled "APPARATUS AND METHOD FOR PERFORMING CONTENTION BASED ACCESS IN MOBILE COMMUNICATION SYSTEM". International Patent Application No. PCT/KR2010/008858 claims priority under 35 U.S.C. §365 and/or 35 U.S.C. §119(a) to Korean Patent Application No. 10-2009-0122762 filed Dec. 10, 2009 and which are incorporated herein by reference into the present disclosure as if fully set forth herein.

TECHNICAL FIELD

The present invention relates to an apparatus and a method for performing a contention-based access in a mobile communication system.

BACKGROUND ART

Mobile communication systems have been developed in order to provide a communication while securing a mobility of users. With remarkable technological development, the current mobile communication systems can provide a high speed data communication service as well as a voice communication service.

Recently, the 3rd Generation Partnership Project (3GPP) is arranging standardizations for the Long Term Evolution (LTE), as one of the next generation mobile communication systems. The LTE is a technology for realizing a high speed packet based communication having a transmission speed of a maximum of about 100 Mbps, which is higher than the currently provided data rate, with targeting at commercialization thereof around the year of 2010, and the standardization job for the LTE has been nearly completed.

Meanwhile, in pace with the completion of the LTE standardization job, discussions about the LTE-Advanced (LTE-A), in which various new technologies relating to the LTE communication system have been grafted, has now started in earnest. One of such new technologies includes a contention based access technology.

The contention based access technology has been proposed in order to solve the problems of the typical uplink transmission according to the prior arts. The typical uplink transmission is performed through dedicated transmission resources allocated by a Base Station or Node B, and an allocation of transmission resources requires a preliminary process of requesting a Node B to allocate the transmission resources by a User Equipment (UE), which may increase the transmission delay.

In order to solve such problems described above, the contention based access technology allows a Node B to use a part of transmission resources as resources for the contention based access. Since the transmission resources having been notified as the resources for the contention based access can be freely used by UEs which will transmit data, signal collision may occur when multiple UEs transmit signals through the same transmission resource. Such a signal collision may remarkably reduce the possibility that the corresponding signals can be successfully decoded in a Node B.

Therefore, there has been a request for a scheme capable of minimizing occurrence of signal collision in a contention based access.

SUMMARY

Accordingly, the present invention has been made to solve the above-mentioned problems occurring in the prior art, and an aspect of the present invention provides an apparatus and a method for minimizing collision between signals transmitted in the uplink by multiple UEs through contention based transmission resources in a mobile communication system.

In accordance with an aspect of the present invention, there is provided a method of performing a contention based access in a User Equipment (UE) of a mobile communication system, the method including: triggering a Buffer Status Report (BSR) to an Enhanced Node B (ENB) if data to be transmitted to the ENB occurs; and triggering the contention based access if the BSR has been triggered.

In accordance with another aspect of the present invention, there is provided a User Equipment (UE) for performing a contention based access in a mobile communication system, the UE comprising: a transmission/reception unit for transmitting and receiving data to and from an Enhanced Node B (ENB); and a control unit for triggering a Buffer Status Report (BSR) to an Enhanced Node B (ENB) if data to be transmitted to the ENB occurs, and triggering the contention based access if the BSR has been triggered.

According to the present invention as described above, it is possible to effectively perform a contention based access.

Further, according to the present invention, it is possible to minimize the collision between signals transmitted from multiple UEs in the uplink transmission through contention based transmission resources in a mobile communication system.

DESCRIPTION OF DRAWINGS

The foregoing and other objects, features and advantages of the present invention will become more apparent from the following detailed description when taken in conjunction with the accompanying drawings in which.

DETAILED DESCRIPTION

Hereinafter, exemplary embodiments of the present invention will be described with reference to the accompanying drawings. In the following description, a detailed description of known functions and configurations incorporated herein will be omitted when it may make the subject matter of the present invention rather unclear.

The present invention presents a method and an apparatus for minimizing occurrence of collision between signals in performing uplink transmission of the signals through contention based transmission resources.

Before describing the present invention in detail, an LTE mobile communication system will be described in more detail with reference to FIGS. 1 to 3.

Figure 1:
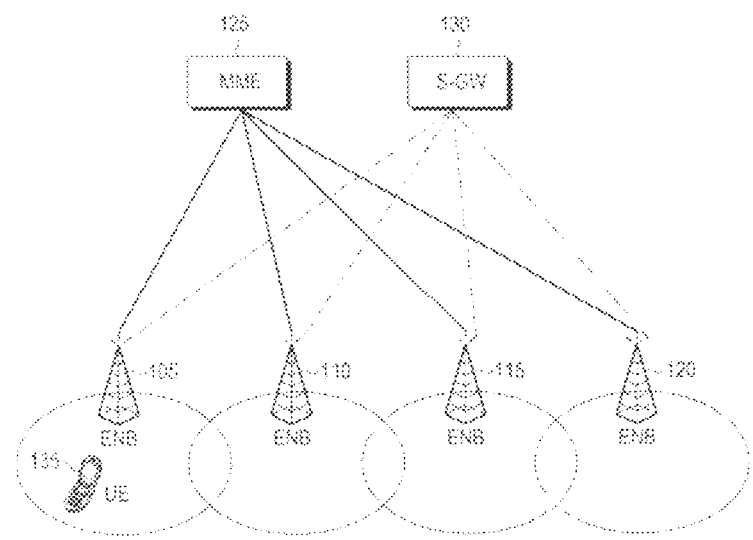
FIG. 1 illustrates a structure of an LTE mobile communication system.

FIG. 1 illustrates a structure of an LTE mobile communication system.

Referring to FIG. 1, a wireless access network of an LTE mobile communication system as shown includes Evolved Node Bs (ENBs or simply Node Bs) 105, 110, 115, and 120, a Mobility Management Entity (MME) 125, and a Serving-Gateway (S-GW) 130. A User Equipment (UE) 135 accesses an external network through the ENBs 105, 110, 115, and 120, and the S-GW 130.

Each of the ENBs 105, 110, 115, and 120 corresponds to an existing Node B of the Universal Mobile Telecommunications System (UMTS). The ENBs 105, 110, 115, and 120 are connected to the UE 135 through a wireless channel and performs a more complicated function than the existing Node B. In the LTE mobile communication system, since all user traffics including real time services, such as Voice over IP (VoIP) service using an Internet protocol, are provided through shared channels, an apparatus for collecting situation information of the UEs and performing the scheduling based on the collected information is necessary and the ENBs 105, 110, 115, and 120 are apparatuses performing such a job. Usually, one ENB controls a plurality of cells. In order to realize a transmission speed of a maximum of 100 Mbps, the LTE mobile communication system uses an Orthogonal Frequency Division Multiplexing (OFDM) scheme as a wireless access technology with a bandwidth of a maximum of 20 MHz. Further, the LTE mobile communication system applies an Adaptive Modulation & Coding (AMC) scheme, which determines a modulation scheme and a channel coding rate in accordance with the channel state of a UE. The S-GW 130 is an apparatus for providing a data bearer and generates or removes a data bearer under the control of THE MME. The MME is an apparatus for performing various control functions and is connected to a plurality of ENBs.

Figure 2:
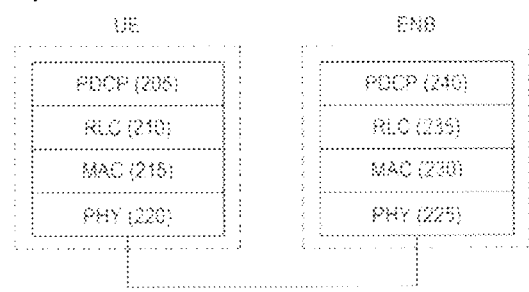
FIG. 2 illustrates a wireless protocol structure of a mobile communication system.

FIG. 2 illustrates a wireless protocol structure of a mobile communication system.

As shown in FIG. 2, a wireless protocol structure of an LTE mobile communication system includes a Packet Data Convergence Protocol (PDCP) layer 205 or 240, a Radio Link Control (RLC) layer 210 or 235, a Medium Access Control (MAC) layer 215 or 230, and Physical layer (PHY) layer 220 or 225. The PDCP layer 205 or 240 performs IP header compression/decompression, etc., and the RLC layer 210 or 235 reconstructs a PDCP Packet Data Unit (PDU) to a proper size and performs an Automatic Repeat reQuest (ARQ). The MAC layer 215 or 230 is connected to various RLC layer devices configured in one UE, and multiplexes PLC PDUs into a MAC PDU or demultiplexes PLC PDUs from a MAC PDU. The PHY layer 220 or 225 channel-codes or modulates higher layer data into an OFDM symbol and then transmits the OFDM symbol through a wireless channel, or demodulates and channel-decodes an OFDM symbol received through a wireless channel and then transfers the demodulated and decoded symbol to a higher layer. Based on the transmission, data input to a protocol entity is called a Service Data Unit (SDU) and data output from a protocol entity is called a Protocol Data Unit (PDU).

Figure 3:
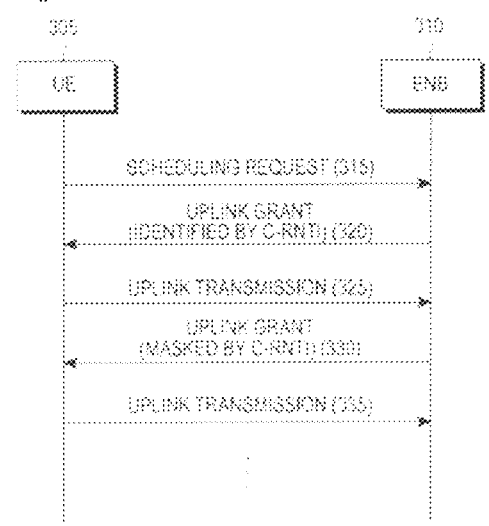
FIG. 3 is a signal flow diagram illustrating a typical uplink transmission process in a mobile communication system.

FIG. 3 is a signal flow diagram illustrating a typical uplink transmission process in a mobile communication system.

In step 315, when predetermined conditions are met, for example, when data to be transmitted occurs, a UE 305 transmits a Scheduling Request (SR) to an ENB 310 in order to request transmission resources. Hereinafter, when a necessity to transmit a scheduling request has occurred, it is expressed as "a scheduling request has been triggered". The scheduling request is divided into a Dedicated Scheduling Request (D-SR) and a Random Access Scheduling Request (RA-SR). The D-SR is transmitted through a dedicated transmission resource allocated to the UE. The transmission resource for the D-SR corresponds to a dedicated transmission resource through which it is possible to transmit 1 bit of information that periodically arrives. When it is necessary to transmit a scheduling request, a UE possessing the transmission resource for the D-SR transmits the D-SR. The ENB 310 may be unable to allocate the transmission resource for the D-SR to all UEs, and a UE which does not possess the transmission resource for the D-SR notifies the ENB through a random access process that there is data to be transmitted to the ENB, and such a notification is expressed as "an RA-SR is transmitted".

Upon receiving the scheduling request signal, the ENB 310 allocates uplink transmission resource to the UE 305. Information for allocating uplink transmission resource is called an uplink grant. In step 320, the ENB 310 transmits the uplink grant to the UE 305 through a downlink scheduling channel. A Cell-Radio Network Temporary Identifier (C-RNTI) is used to identify the UE to which the uplink grant is transmitted. The uplink grant contains information of transmission resources for uplink transmission by the UE, Modulation and Coding Set (MCS) information to be applied to the uplink transmission, and information necessary for a Hybrid Automatic Repeat reQuest (HARQ) operation. Based on the information contained in the uplink grant, the UE performs an uplink grant at a time point after a predetermined time interval from the time point when the uplink grant has been received. While the UE possesses data to be transmitted, the ENB can continuously allocate the uplink grant to the UE.

Figure 4:
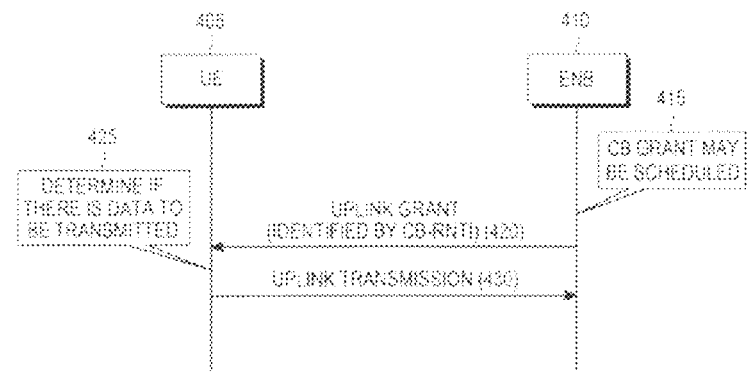
FIG. 4 illustrates an example of a contention based access in a mobile communication system.

FIG. 4 illustrates an example of a contention based access in a mobile communication system. Hereinafter, a contention based access operation will be described with reference to FIG. 4.

In step 415, an ENB 410 determines to schedule a contention based access transmission resource at a predetermined time point. The predetermined time point may be, for example, a time point when transmission resource is left without being allocated to a UE because the cell does not have a big load. Since the contention based access resource is a transmission resource allocated to unspecified multiple UEs, it is allocated through an identifier, which has been pre-notified (or individually notified to connected UEs), rather than through a C-RNTI, which is a specific identifier of a UE. The identifier, which has been pre-notified (or individually notified to connected UEs), is called a Contention Based-Radio Network Temporary Identifier (CB-RNTI).

In step 420, the ENB 410 transmits an uplink grant identified by a CB-RNTI. In the following description, an uplink grant identified by a CB-RNTI and an uplink grant for contention based access are mixedly used.

Upon receiving the uplink grant for contention based access, the UE 405 determines, in step 425, if there is data to be transmitted. When there is data to be transmitted, the UE 405 transmits the data by using the uplink grant for contention based access in step 430.

When UEs having data to be transmitted include more than one UE having received the uplink grant for contention based access, there is an increasing probability that a collision due to the uplink transmission of step 430 may occur.

1st Embodiment

The first embodiment of the present invention presents a method and an apparatus, which allow only a UE having a remarkable necessity to use an uplink grant (which will hereinafter be referred to as contention based uplink grant) for contention based access, in order to minimize the probability that a collision in the uplink transmission for contention based access may occur. Hereinafter, for convenience of description, the state in which use of a contention based uplink grant has been allowed is referred to as a state in which a contention based access has been triggered.

The contention based access is triggered or cancelled in connection with an occurrence of a predetermined event described below, and a contention based access can be performed in a state in which the contention based access has been triggered and has not been cancelled yet. The state in which the contention based access has been triggered and has not been cancelled yet is expressed as a state in which a contention based access has been triggered or a contention based access is pending. In the state in which a contention based access is pending, a UE monitors a downlink control channel to determine if there is an uplink grant scheduled by a CB-RNTI, in order to receive a contention based access.

The most important reason for the introduction of a contention based access is to reduce the transmission delay by enabling an uplink transmission even before execution of a separate scheduling request process. As shown in FIG. 3, after a UE performs a scheduling request process, it is usual that an ENB continuously allocates transmission resources to the UE. Therefore, a UE having completed a scheduling request process does not have a big necessity for use of a contention based uplink grant. In other words, it can be said that an interval from a time point at which a scheduling request is necessary, for example, a time point at which a necessity for an urgent transmission of important data occurs, to a time point at which a scheduling request is actually performed, corresponds to a time interval for which uplink transmission by a contention based uplink grant is most useful.

According to the first embodiment of the present invention, a UE triggers a contention based access when a scheduling request has been triggered, and cancels the contention based access when the scheduling request has been transmitted or canceled.

Figure 5:
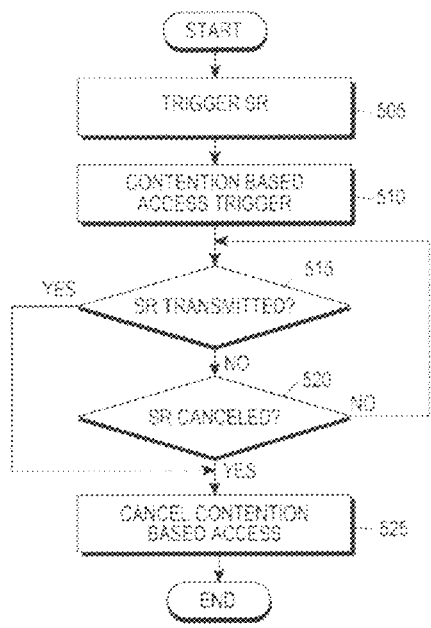
FIG. 5 is a flowchart illustrating an operation of a UE according to the first embodiment of the present invention.

FIG. 5 is a flowchart illustrating an operation of a UE according to the first embodiment of the present invention.

When a scheduling request has been triggered in step 505, the UE 405 proceeds to step 510, in which the UE triggers a contention based access.

The scheduling request is triggered when a Buffer Status Report (BSR) has been triggered. In other words, the UE triggers a contention based access when a BSR has been triggered.

The situations in which a regular BSR is triggered are described in detail in 5.4.5 of the 3rd Generation Partnership Project (3GPP) 36.321. In brief, a regular BSR is triggered in the following situations.

When the priority of newly occurred uplink data is higher than the priority of uplink data currently stored in a UE.

When a predetermined timer named "retxBSR-Timer" expires.

For reference, a Buffer Status Report (BSR) is a message reporting a buffer status of a UE according to a predetermined format and its format is described in 6.1.3.1 of the 3GPP 36.321.

The fact that a contention based access has been triggered implies that a contention based access can be performed, and a UE monitors whether an uplink grant identified by a CB-RNTI is received while the contention based access has been triggered. Further, when an uplink grant identified by a CB-RNTI has been received, the UE can perform a contention based uplink transmission by using the uplink grant identified by the CB-RNTI.

In order to determine whether to cancel the triggered contention based access, the UE 405 proceeds to step 515. In step 515, the UE 405 determines if the scheduling request triggered in step 505 has been transmitted. When the scheduling request has been already transmitted, which implies that it is not highly necessary to perform a contention based access, the UE 405 proceeds to step 525, in which the UE 405 cancels the contention based access. The cancellation of the contention based access implies that the corresponding UE does not use the uplink transmission resource identified by the CB-RNTI any more, which implies that the UE does not perform a monitoring any more for determining if an uplink grant identified by the CB-RNTI is received.

However, as a result of the determination in step 515, when the scheduling request has not been transmitted yet, the UE 405 proceeds to step 520, in which the UE 405 determines whether the scheduling request is cancelled or not. Conditions for cancellation of the scheduling request are described in 5.4.4 of the 3GPP 36.321. To briefly describe 5.4.4 of the 3GPP 36.321, the scheduling request is cancelled when the BSR is transmitted. When the scheduling request has been cancelled, that is, when the BSR has been transmitted, the UE 405 proceeds to step 525, in which the UE 405 cancels the contention based access. As a result of the determination in step 520, when the scheduling request has not been cancelled, the UE 405 maintains the state in which the contention based access has been triggered (or the contention based access is pending) and returns to step 515, in which the UE keeps on performing the monitoring for determining whether to cancel the contention based access.

2nd Embodiment

While the convention based access has been triggered, a UE continuously performs a contention based uplink transmission, which increases the probability of collision with a contention based uplink transmission signal from another UE. In order to solve this problem, the second embodiment of the present invention presents a solution of prohibiting a contention based uplink transmission during a predetermined time interval after the contention based uplink transmission by a UE.

Figure 6:
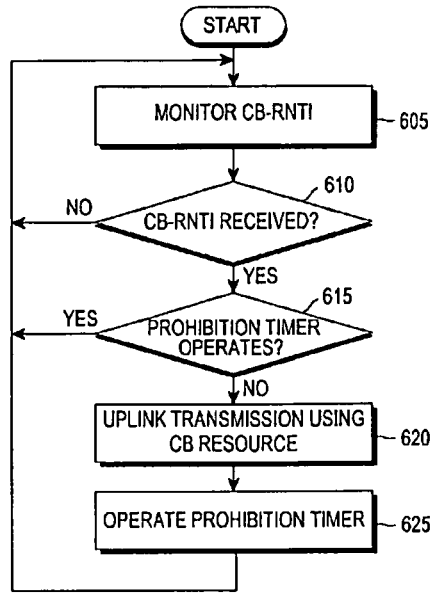
FIG. 6 is a flowchart illustrating an operation of a UE according to the 2-1st embodiment of the present invention.

FIG. 6 is a flowchart illustrating an operation of a UE according to the 2-1st embodiment of the present invention.

When a contention based access has been triggered, the UE 405 performs the operation as shown in FIG. 6.

First, in step 605, the UE 405 performs a monitoring in order to determine if an uplink grant identified by a CB-RNTI, that is, a contention based uplink grant, is received. In step 610, the UE 405 determines if a contention based uplink grant has been received. When a contention based uplink grant has not been received, the UE 405 returns to step 605. However, when a contention based uplink grant has been received, the UE 405 proceeds to step 615, in which the UE 405 determines if a prohibition timer is operating. When a prohibition timer is operating, the UE 405 does not use the contention based uplink grant and returns to step 605. As a result of the determination in step 615, when a prohibition timer is not operating, the UE 405 proceeds to step 620, in which the UE 405 performs an uplink transmission by using a transmission format and an uplink transmission resource allocated by the received contention based uplink grant. At this time, in order to determine whether to perform an uplink transmission, it is possible to apply another rule.

After performing a contention based uplink transmission in step 620, the UE 405 operates the prohibition timer in step 625 and then returns to step 605.

Figure 7:
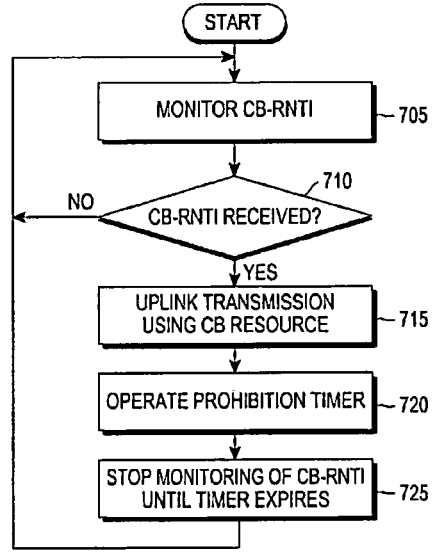
FIG. 7 is a flowchart illustrating an operation of a UE according to the 2-2nd embodiment of the present invention.

FIG. 7 is a flowchart illustrating an operation of a UE according to the 2-2nd embodiment of the present invention. According to the 2-2nd embodiment of the present invention, the UE does not monitor the CB-RNTI while a prohibition timer operates.

When a contention based access has been triggered, the UE 405 monitors the CB-RNTI in step 705. In other words, the UE 405 performs a monitoring in order to determine if a contention based uplink grant is received. In step 710, the UE 405 determines if a contention based uplink grant has been received. When a contention based uplink grant has not been received, the UE 405 returns to step 705. However, when a contention based uplink grant has been received, the UE 405 proceeds to step 715, in which the UE 405 performs an uplink transmission by using a transmission format and an uplink transmission resource allocated by the received contention based uplink grant. As a result of the determination in step 710, when a contention based uplink grant has not been received, the UE 405 returns to step 705, in which the UE 405 keeps on monitoring the CB-RNTI. After performing a contention based uplink transmission, the UE 405 operates a predetermined prohibition timer in step 720. Then, in step 725, the UE 405 stops monitoring the CB-RNTI while the prohibition timer is operating. That is, the UE 405 does not perform a predetermined process for determining whether to receive a contention based uplink grant. When the prohibition timer expires, the UE 405 returns to step 705.

3rd Embodiment

In general, it is reasonable that a contention based access is also canceled when an SR is cancelled. However, in the case of a UE to which a D-SR transmission resource is not allocated, an association between a cancellation of an SR and a cancellation of a contention based access may unnecessarily limit the contention based access.

Figure 8:
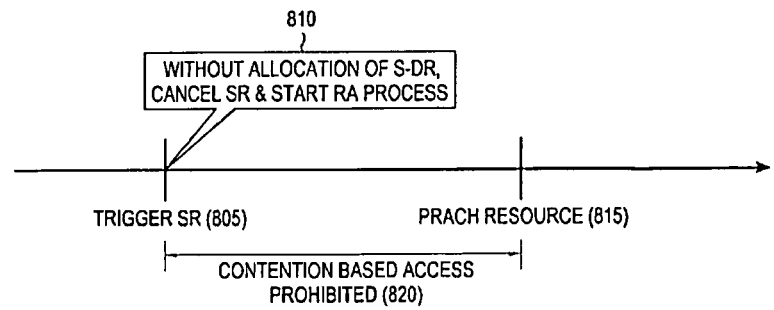
FIG. 8 illustrates a problem that a contention based access may be canceled before a random access process is performed.

FIG. 8 illustrates a problem that a contention based access may be canceled before a random access process is performed. When an SR is triggered, a UE to which a D-SR transmission resource is not allocated instantly cancels the SR and starts a random access process (step 810). The random access process includes transmission of a random access preamble, reception of a random access response, and settlement of collision, wherein the transmission of a random access preamble is not always possible but is possible only through a pre-allocated random access transmission resource (PRACH resource) 815. Therefore, even after the random access process starts, a random access preamble may be transmitted after passage of a considerable amount of time. Therefore, it is preferable to allow a contention based access even when an SR is cancelled, during an interval 820 from the starting of a random access to the transmission of a random access preamble.

Figure 9:
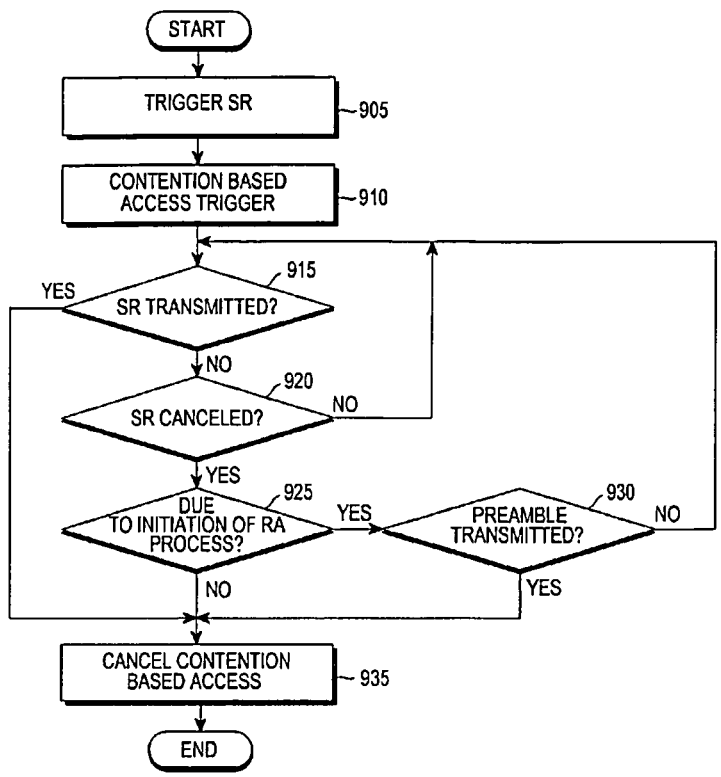
FIG. 9 is a flowchart illustrating an operation of a UE according to the 3-1st embodiment of the present invention.

FIG. 9 is a flowchart illustrating an operation of a UE according to the 3-1st embodiment of the present invention.

When an SR is triggered in step 905, the UE 405 proceeds to step 910, in which the UE triggers a contention based access.

The fact that a contention based access has been triggered implies that a contention based access can be performed, and a UE monitors whether an uplink grant identified by a CB-RNTI is received while the contention based access has been triggered. Further, when an uplink grant identified by a CB-RNTI has been received, the UE can perform a contention based uplink transmission by using the uplink grant identified by the CB-RNTI.

In order to determine whether to cancel the triggered contention based access, the UE 405 proceeds to step 915. In step 915, the UE 405 determines if the scheduling request triggered in step 905 has been transmitted. When the scheduling request has been already transmitted, which implies that it is not highly necessary to use a contention based access, the UE 405 proceeds to step 935, in which the UE 405 cancels the contention based access. The fact that the scheduling request has been already transmitted implies that a D-SR has been transmitted. The cancellation of the contention based access implies that the corresponding UE does not use the uplink transmission resource identified by the CB-RNTI any more, which implies that the UE does not perform any more a monitoring for determining if an uplink grant identified by the CB-RNTI is received.

However, as a result of the determination in step 915, when the SR has not been transmitted yet, the UE 405 proceeds to step 920, in which the UE 405 determines whether the scheduling request is cancelled or not. As a result of the determination in step 920, when the SR has not been cancelled, the UE 405 maintains the state in which the contention based access has been triggered and returns to step 915, in which the UE keeps on performing the monitoring for determining whether to cancel the contention based access. However, when the scheduling request has been cancelled, the UE 405 proceeds to step 925, in which the UE 405 determines if the cancellation of the SR is due to an initiation of the random access process. When the cancellation of the SR is due to an initiation of the random access process, the UE 405 proceeds to step 930, in which the UE 405 determines if a random access preamble has been already transmitted in the started random access process. When a random access preamble has not been transmitted yet, the UE 405 maintains the state in which the contention based access has been triggered and returns to step 915 in order to determine whether to cancel the contention based access. In contrast, when a random access preamble has been already transmitted, which implies that the random access process has been actually started, the UE 405 proceeds to step 935, in which the UE 405 cancels the contention based access.

Figure 10:
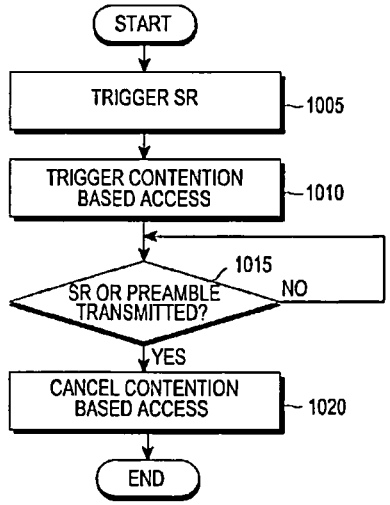
FIG. 10 is a flowchart illustrating an operation of a UE according to the 3-2nd embodiment of the present invention.

FIG. 10 is a flowchart illustrating an operation of a UE according to the 3-2nd embodiment of the present invention. The 3-2nd embodiment of the present invention corresponds to a simplified modification of the 3-1st embodiment of the present invention.

When an SR is triggered in step 1005, the UE 405 proceeds to step 1010, in which the UE triggers a contention based access.

In step 1015, the UE 405 determines if a D-SR or a random access preamble has been already transmitted. If a D-SR has been triggered by the SR triggered in step 1005, the UE 405 cancels the contention based access when the D-SR has been transmitted. If an RA-SR has been triggered by the SR triggered in step 1005, the UE 405 cancels the contention based access when the random access preamble has been transmitted. In order to determine if conditions for cancellation of the contention based access are met, the UE 405 proceeds to step 1015, in which the UE 405 determines if any one of the D-SR and the random access preamble has been transmitted. When any one of the D-SR and the random access preamble has been transmitted, which implies that there is a remarkably reduced necessity for the contention based access, the UE 405 proceeds to step 1020, in which the UE 405 cancels the contention based access. When neither of the D-SR nor the random access preamble has been transmitted, the UE 405 maintains the state in which the contention based access has been triggered, and returns to step 1015 in order to determine whether to cancel the contention based access.

While determining whether to cancel the contention based access, since the contention based access is pending, it goes without saying that the UE monitors the CB-RNTI.

4th Embodiment

Figure 11:
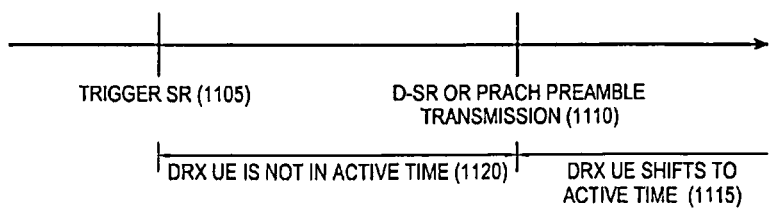
FIG. 11 illustrates a problem that a UE performing a discontinuous reception is unable to perform a contention based access before transmission of a scheduling request.

FIG. 11 illustrates a problem that a UE performing a discontinuous reception is unable to perform a contention based access before transmission of a scheduling request.

A UE may perform a discontinuous reception in order to reduce the power consumption of the UE. During the discontinuous reception, the UE monitors a Physical Downlink Control Channel (PDCCH) during only a predetermined time interval according to a predetermined rule, wherein the time interval for the monitoring of the PDCCH is called an active time. Since an uplink grant is transmitted through the PDCCH, a UE performing a discontinuous reception can receive an uplink grant only in the active time.

When an SR is triggered, a UE performing a discontinuous reception does not instantly shift the active time but shifts to the active time after transmitting a D-SR or a random access preamble. As a result, during the time interval from the time point 1105 at which the SR is triggered to the time point 1110 at which the D-SR or random access preamble is transmitted, a UE performing a discontinuous reception cannot perform a contention based access.

The fourth embodiment of the present invention defines monitoring of a PDCCH by a UE regardless of the active time while a contention based access has been triggered in order to solve the problem described above.

Figure 12:
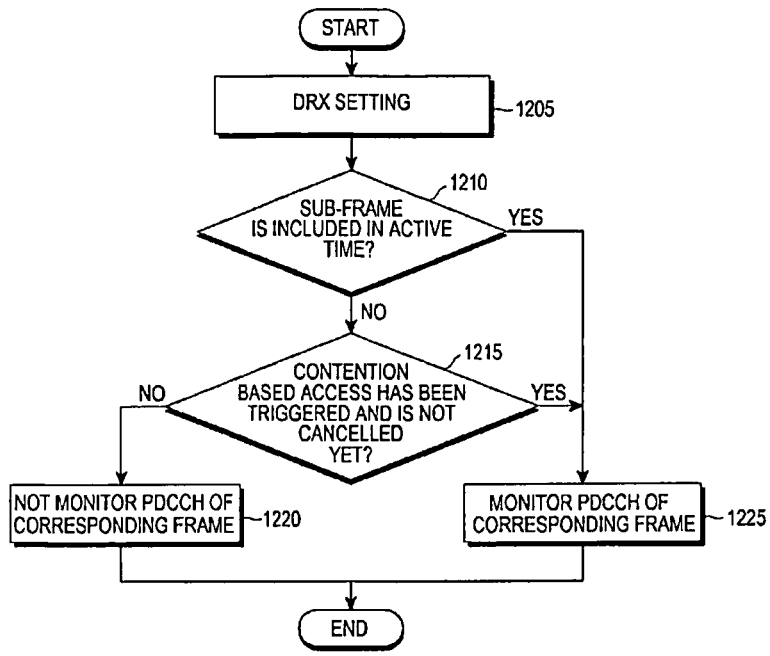
FIG. 12 is a flowchart illustrating an operation of a UE according to the fourth embodiment of the present invention.

FIG. 12 is a flowchart illustrating an operation of a UE according to the fourth embodiment of the present invention.

In step 1205, a discontinuous reception is set for the UE 405. The UE 405 receives parameters necessary for the discontinuous reception, such as discontinuous reception (DRX) length and offset, from an ENB, and determines the time point, at which the UE will shift to the active time, by using the parameters. At each sub-frame, the UE 405, for which the discontinuous reception is set, proceeds to step 1210, in which the UE 405 determines if the sub-frame is included in the active time. Standards for the inclusion of the active time are described in detail in 5.7 of the 3GPP 36.321. To briefly describe 5.7 of the 3GPP 36.321, the UE 405 identifies a sub-frame in which a predetermined timer, which is operated either periodically or when a particular condition is met, is operating, as a sub-frame belonging to the active time. When it is determined that a corresponding sub-frame belongs to the active time, the UE 405 proceeds to step 1225 in which the UE 405 monitors a PDCCH of the corresponding sub-frame. When it is determined that a corresponding sub-frame does not belong to the active time, the UE 405 proceeds to step 1215 in which the UE 405 determines if it is in a state in which a contention based access has been triggered and is not cancelled yet. When the answer of the determination is yes, the UE 405 determines that the corresponding sub-frame belongs to the active time and proceeds to step 1225 in which the UE 405 monitors the PDCCH of the corresponding sub-frame. However, as a result of the determination in step 1215, when the contention based access is not triggered yet or has been already cancelled after being triggered, the UE 405 proceeds to step 1220 in which the UE 405 does not monitor the PDCCH of the corresponding sub-frame.

5th Embodiment

Figure 13:
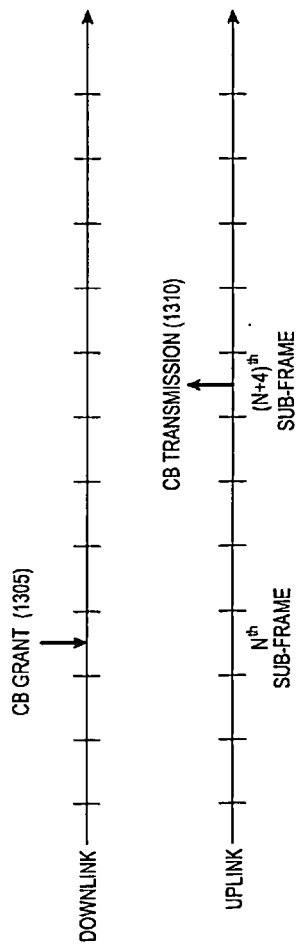
FIG. 13 illustrates a problem that a contention based uplink transmission and a typical uplink transmission are performed in the same sub-frame.

FIG. 13 illustrates a problem that a contention based uplink transmission and a typical uplink transmission are performed in the same sub-frame.

In some cases, a contention based uplink transmission and another uplink transmission may overlap with each other. For example, when a UE has received a contention based uplink grant at the Nth sub-frame, the UE performs an uplink transmission at the (N+4)th sub-frame (1310). At this time, if a so-called Semi Persistent Scheduling resource (see 3GPP 36.321 5.10) has been set for the (N+4)th sub-frame, the contention based uplink transmission overlaps with another uplink transmission. The fifth embodiment of the present invention presents an operation of a UE when a contention based uplink transmission and another uplink transmission overlap with each other.

Figure 14:
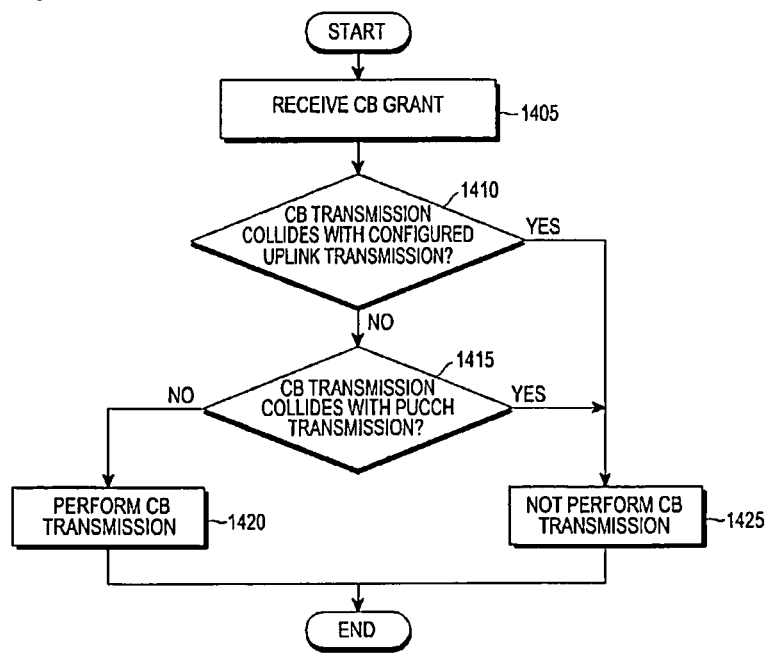
FIG. 14 is a flowchart illustrating an operation of a UE according to the fifth embodiment of the present invention.

FIG. 14 is a flowchart illustrating an operation of a UE according to the fifth embodiment of the present invention.

When the UE 405 has received a contention based uplink grant in step 1405, the UE 405 performs the determination steps including step 1410 and step 1415 in order to determine whether to perform an uplink transmission by using the contention based uplink grant. The sequence between the determination steps is not important or fixed and can be changed to another sequence.

In step 1410, the UE 405 determines if an uplink transmission by the contention based uplink grant received in step 1405 will be performed at the same sub-frame as that for an uplink transmission by a configured uplink grant. The configured uplink grant corresponds to a term having the same meaning as the semi persistent transmission resource, and an ENB may pre-allocate a periodically arriving uplink transmission resource to a UE, which is expressed as "a UE has a configured uplink grant" or "a semi persistent transmission resource has been allocated to a UE". The configured uplink grant is especially proper for a service in which a small-sized packet, such as Voice over Internet Protocol (VoIP), periodically occurs. As a result of the determination in step 1410, when it is determined that an uplink transmission by the contention based uplink grant received in step 1405 is performed at the same sub-frame as that for an uplink transmission by a configured uplink grant, the UE 405 proceeds to step 1425, in which the UE 405 disregards the received contention based uplink grant and does not perform a contention based uplink transmission. In step 1415, the UE 405 determines if a contention based uplink transmission will be performed at the same sub-frame as that for transmission of a Physical Uplink Control Channel (PUCCH). The PUCCH is a channel through which uplink control information is transmitted, and the uplink control information transmitted through the PUCCH includes HARQ feedback information, channel status information, and an uplink Sounding Reference Signal (SRS). The uplink control signal is transmitted at a predetermined time point identified by both the UE and the ENB. Therefore, when the UE performs an uplink transmission by a contention based uplink grant instead of transmitting an uplink control signal, the ENB may misidentify an uplink transmission signal by the contention based uplink grant as the uplink control signal and decode the misidentified uplink transmission signal, which may cause a mis-operation. Therefore, when a contention based uplink grant indicates a contention based uplink transmission at the same sub-frame as the sub-frame at which an uplink control signal will be transmitted, the UE 405 proceeds to step 1425, in which the UE 405 disregards the received contention based uplink grant and does not perform a contention based uplink transmission. When the contention based uplink transmission does not overlap with an uplink control signal, the UE 405 proceeds to step 1420 in which the UE 405 performs a contention based uplink transmission at a predetermined sub-frame.

6th Embodiment

A typical uplink grant for an uplink transmission contains transmission resource information, transmission format information, information for an HARQ operation, and other information. Use of the format of a typical uplink grant without change for a contention based access is preferable in view of minimization of change in the standards. However, the contention based access does not require all information provided by the typical uplink grant, some fields of the typical uplink grant may not be used. The sixth embodiment of the present invention presents a method and an apparatus for providing information of controlling the probability of collision between contention based accesses by using unused fields.

Table 1 below show types of sizes of information provided by a typical uplink grant.

TABLE 1

| Field | Size |
|---|---|
| Format0/Format1A discrimination flag | 1 |
| Hopping flag | 1 |
| Transmission resource | Variable |
| Transmission format (e.g. MCS) | 5 |
| New data indicator | 1 |
| Transmission output control command | 2 |
| Channel status report request | 1 |

The format0/format 1A discrimination flag is a flag for discrimination between format0, which is an uplink grant, and format1A, which is a downlink grant. This discrimination is information necessary for a case when a destination of a grant is identified by a C-RNTI, which is an identifier specific to a UE. Since a separate identifier named CB-RNTI is used for a contention based uplink grant, this flag is not necessary for the contention based uplink grant.

The hopping flag is a one bit flag for indicating whether to perform a hopping at the time of uplink retransmission. Based on an assumption that an HARQ operation is not applied to the contention based uplink grant, the contention based uplink grant does not require the hopping flag, either.

The new data indicator is a field necessary for HARQ retransmission in the HARQ operation. As long as the HARQ operation is not applied, the contention based uplink transmission does not require the new data indicator.

The transmission output control command is information indicating increase/decrease of an uplink transmission output of a UE, and is useless in the contention based uplink transmission in which an ENB does not know the UE that will perform the uplink transmission.

The channel status report request indicates reporting of channel status together with an uplink transmission, and is useless in the contention based uplink transmission in which an ENB does not know the UE that will perform the uplink transmission.

As described above, unused 6 bits occur in the case of transmitting a contention based uplink grant by using the format of a typical uplink grant.

In the sixth embodiment of the present invention, an ENB inserts parameters, which correspond to a contention based access allowance probability (hereinafter, referred to as "access allowance probability") and a contention based access allowance logical channel priority (hereinafter, referred to as "access allowance logical channel priority"), in the 6 bit information and then transmits the information.

Figure 15:
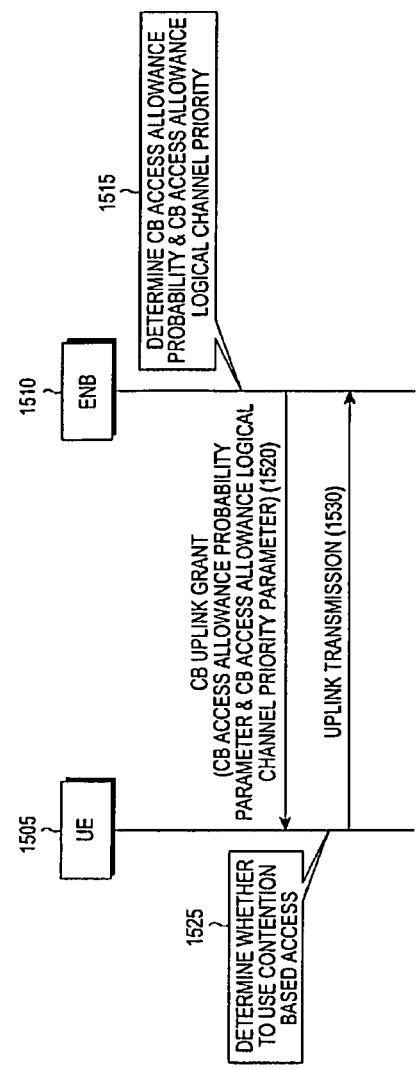
FIG. 15 is a signal flow diagram illustrating an operation between a UE and an ENB according to the sixth embodiment of the present invention.

FIG. 15 is a signal flow diagram illustrating an operation between a UE and an ENB according to the sixth embodiment of the present invention.

When there is a transmission resource to be used for a contention based access at a predetermined time point, the ENB 1510 determines an access allowance probability and an access allowance logical channel priority, which are to be applied to the contention based access, in step 1515. Further, the ENB 1510 selects parameters corresponding to the access allowance probability and the access allowance logical channel priority determined in step 1520, and inserts the selected parameters in predetermined fields of a contention based uplink grant and transmits the contention based uplink grant. The predetermined fields may include fields of the format0/format 1A discrimination flag, the hopping flag, the new data indicator, the transmission output control command, and the channel status report request. Upon receiving a contention based uplink grant, the UE 1505 calculates the access allowance probability and the access allowance logical channel priority from the access allowance probability parameter and the access allowance logical channel priority parameter, and determines, by using the information, whether to use a contention based access, in step 1525. As a result of the determination, when use of a contention based access is allowed, the UE 1505 performs an uplink transmission in step 1530.

Figure 16:
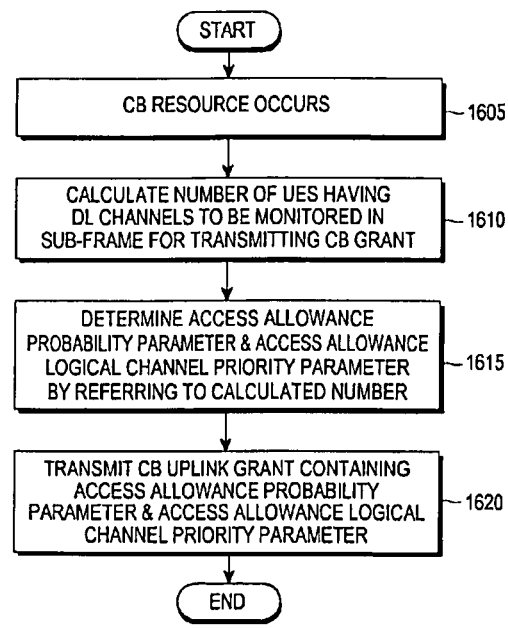
FIG. 16 is a flowchart illustrating an operation of an ENB according to the sixth embodiment of the present invention.

FIG. 16 is a flowchart illustrating an operation of an ENB according to the sixth embodiment of the present invention.

When a transmission resource that can be used for a contention based access occurs in step 1605, for example, when an uplink transmission resource remaining without being allocated occurs, the ENB 1510 proceeds to step 1610. In step 1610, the ENB 1510 calculates the number of UEs that will monitor a downlink control channel in a sub-frame through which a contention based uplink grant will be transmitted.

The number of UEs corresponds to a sum of the number of connected UEs, which do not perform a discontinuous reception, and the number of connected UEs, which are performing a discontinuous reception and have sub-frames in an active time state. The sum corresponds to a maximum number of potential UEs capable of performing a contention based uplink transmission, and the ENB 1510 determines access allowance probability parameter and the access allowance logical channel priority parameter according to the size of the sum in step 1615. When the number of potential contention based uplink access UEs calculated in step 1610 is large, which implies there is a high probability that a collision may occur, the ENB 1510 can determine a low access allowance probability in accordance with the high probability. When the number of potential contention based uplink access UEs calculated in step 1610 is large, the ENB 1510 may determine an access allowance logical channel priority parameter that allows only data having a high priority to perform a contention based access.

The access allowance probability parameter is a parameter, by which it is possible to calculate a predetermined probability value according to a pre-promised rule. There may be various methods for calculating an actual allowance probability from the access allowance probability parameter. The easiest method is to previously map code points of the access allowance probability parameter to particular probability values. For example, when the access allowance probability parameter has three bits, the relation between them can be determined in advance as shown in Table 2 below.

TABLE 2

| access allowance probability parameter | allowance probability |
|---|---|
| 0 | 0.125 |
| 1 | 0.25 |
| 2 | 0.375 |
| 3 | 0.5 |
| 4 | 0.625 |
| 5 | 0.75 |
| 6 | 0.875 |
| 7 | 1 |

Otherwise, the access allowance probability parameter and the actual allowance probability may be defined by Equation (1) below.

$$\text{Allowance Probability} = 1/K^{(\text{Access Allowance Probability Parameter})} \quad (1)$$

In Equation (1), K may be a predetermined constant or a settable parameter that can be known from the system information.

When the access allowance probability parameter has three bits and K has a value of 1.5, the relation between the access allowance probability parameter and the actual allowance probability can be calculated as in Table 3 below.

TABLE 3

| access allowance probability parameter | allowance probability |
|---|---|
| 0 | 1 |
| 1 | 0.666667 |
| 2 | 0.444444 |
| 3 | 0.296296 |
| 4 | 0.197531 |
| 5 | 0.131687 |

TABLE 3-continued

| access allowance probability parameter | allowance probability |
|---|---|
| 6 | 0.087791 |
| 7 | 0.058528 |

Meanwhile, the access allowance logical channel priority parameter may indicate the priority by itself, or a mapping relation between the access allowance logical channel priority parameter and the allowance logical channel priority may be set in advance.

For example, when two bits are used for the access allowance logical channel priority parameter, the relation between the access allowance logical channel priority parameter and the allowance logical channel priority may be defined as in Table 4 below.

TABLE 4

| access allowance logical channel priority parameter | allowance logical channel priority |
|---|---|
| 0 | Priorities higher than priority a |
| 1 | Priorities higher than priority b |
| 2 | Priorities higher than priority c |
| 3 | All priorities |

Referring again to FIG. 16, in step 1620, the UE 1505 transmits a contention based uplink grant, which contains the determined access allowance probability parameter and the access allowance logical channel priority parameter, at a predetermined sub-frame.

Figure 17:
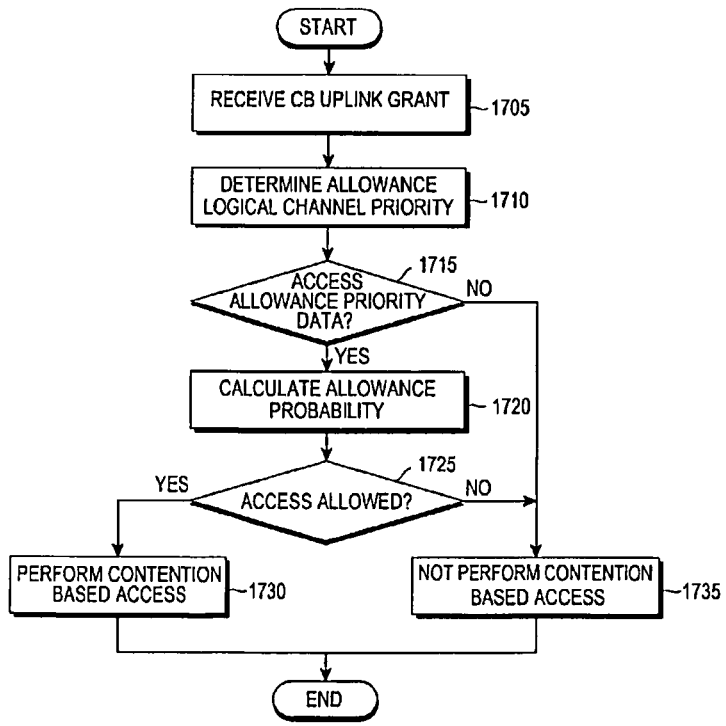
FIG. 17 is a flowchart illustrating an operation of a UE according to the sixth embodiment of the present invention.

FIG. 17 is a flowchart illustrating an operation of a UE according to the sixth embodiment of the present invention.

In step 1705, the UE 1505 receives a contention based uplink grant. In step 1710, the UE 1505 analyzes the access allowance logical channel priority parameter contained in the uplink grant, thereby determining the priority of the data for which the contention based access has been allowed.

In step 1715, the UE 1505 determines if there is data having a priority, for which a contention based access is allowed, from among stored transmissible data at a corresponding time point. When the stored transmissible data includes data having a priority for which a contention based access is allowed, the UE 1505 proceeds to step 1720. However, when the stored transmissible data does not include data having a priority for which a contention based access is allowed, the UE 1505 proceeds to step 1735.

In step 1720, the UE 1505 calculates an actual allowance probability by using the access allowance probability parameter contained in the received uplink grant. This calculation may be performed using either a predetermined equation, such as Equation (1), or a predetermined mapping relation as shown in Table 2. In step 1725, the UE 1505 randomly selects a real number between 0 and 1, and determines if the selected real number is smaller than the allowance probability. When the selected real number is smaller than the allowance probability, which implies that a contention based access has been allowed, the UE 1505 proceeds to step 1730. In contrast, when the selected real number is not smaller than the allowance probability, which implies that a contention based access has not been allowed, the UE 1505 proceeds to step 1735. In step 1730, the UE 1505 performs a contention based uplink transmission by referring to transmission format information and transmission resource information contained in the received contention based uplink grant. In step 1735, the UE 1505 does not perform a contention based uplink transmission.

Figure 18:
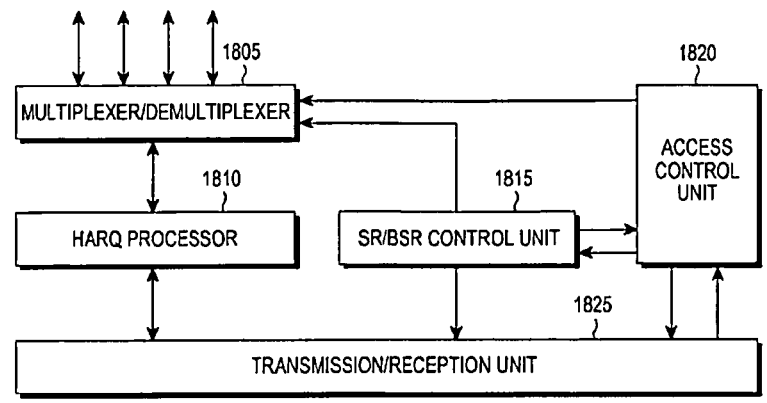
FIG. 18 is a block diagram illustrating a UE apparatus according to an embodiment of the present invention.

FIG. 18 is a block diagram illustrating a UE apparatus according to an embodiment of the present invention.

It should be noted that a higher layer device is not shown in the block diagram of FIG. 18. Referring to FIG. 18, a UE apparatus according to an embodiment of the present invention includes a multiplexer/demultiplexer 1805, an HARQ processor 1810, an SR/BSR control unit 1815, an access control unit 1820, and a transmission/reception unit 1825.

The HARQ processor 1810 corresponds to a set of soft buffers configured to perform an HARQ operation and is identified by an HARQ process identifier.

The multiplexer/demultiplexer 1805 configures a MAC PDU by concatenating data transferred from multiple logical channels or demultiplexes a MAC PDU into MAC SDUs and transfers the MAC SDUs to proper logical channels.

The SR/BSR control unit 1815 monitors occurrence of higher layer data and determines whether to perform a BSR trigger. When the BSR is triggered, the SR/BSR control unit 1815 triggers an SR and reports it to the access control unit 1820. When the triggered SR is cancelled, the SR/BSR control unit 1815 reports it to access control unit 1820.

The access control unit 1820 analyzes a contention based uplink grant and a typical uplink grant received through a downlink control channel and causes the transmission/reception unit 1825 to perform an uplink transmission.

According to the first embodiment of the present invention, the access control unit 1820 controls a contention based access trigger. In other words, the access control unit 1820 receives a report about whether to perform an SR trigger from the SR/BSR control unit 1815, triggers a contention based access when an SR has been triggered, and cancels the contention based access when an SR has been transmitted or canceled. Further, during an interval from triggering of a contention based access to cancellation of the contention based access, the access control unit 1820 controls the transmission/reception unit 1825, so as to receive and decode an uplink grant identified by a predetermined identifier, such as a CB-RNTI. Further, under the control of the access control unit 1820, the transmission/reception unit 1825 performs a contention based uplink transmission based on information of the decoded contention based uplink grant.

According to the second embodiment of the present invention, the access control unit 1820 controls the transmission/reception unit 1825, so as to operate a predetermined timer whenever performing a contention based uplink transmission and to prevent decoding of a contention based uplink grant even in a state in which a contention based uplink access has been triggered while the timer operates.

According to the third embodiment of the present invention, the access control unit 1820 controls the transmission/reception unit 1825, so as to prevent cancellation of a contention based access before a random access preamble is transmitted in the case in which the cancellation of the SR is due to an initiation of the random access process.

According to the fourth embodiment of the present invention, the access control unit 1820 controls the transmission/reception unit 1825, so as to maintain the active time in a state in which a contention based access has been triggered.

According to the fifth embodiment of the present invention, the access control unit 1820 determines if a contention based uplink transmission collides with an uplink control signal transmission or a configured uplink transmission and controls the transmission/reception unit 1825, so as to perform an uplink control signal transmission or a configured uplink transmission when a collision occurs.

According to the sixth embodiment of the present invention, the access control unit 1820 determines whether to perform a contention based uplink transmission by referring to a contention based access allowance logical channel priority parameter and a contention based access allowance probability parameter contained in a contention based uplink grant.

The transmission/reception unit 1825 transmits or receives a MAC PDU, control information, or an HARQ packet through a wireless channel.

Figure 19:
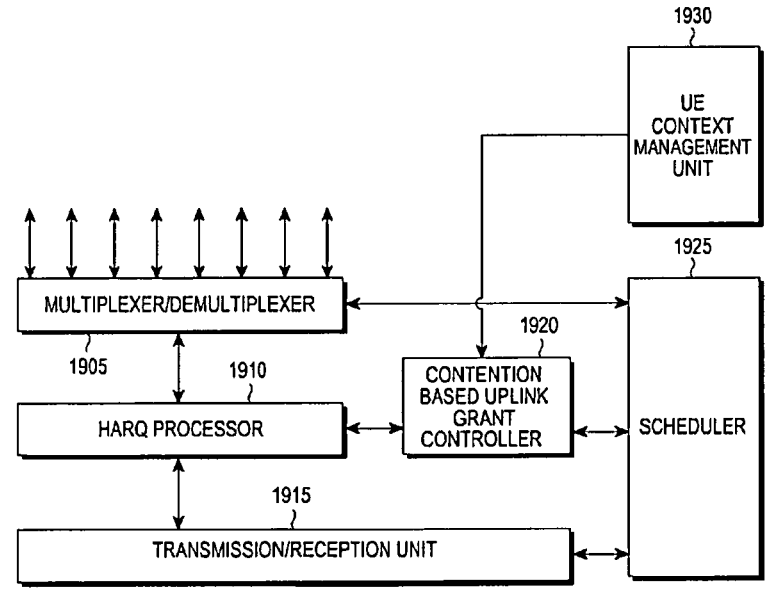
FIG. 19 is a block diagram illustrating a structure of an ENB apparatus according to an embodiment of the present invention.

FIG. 19 is a block diagram illustrating a structure of an ENB apparatus according to an embodiment of the present invention.

It should be noted that a higher layer device is not shown in the block diagram of FIG. 19. Referring to FIG. 19, an ENB apparatus according to an embodiment of the present invention includes a multiplexer/demultiplexer 1905, an HARQ processor 1910, a transmission/reception unit 1915, a contention based uplink grant controller 1920, a scheduler 1925, and a UE context management unit 1930.

The multiplexer/demultiplexer 1905 configures a MAC PDU by concatenating data transferred from multiple logical channels or demultiplexes a MAC PDU into MAC SDUs and transfers the MAC SDUs to proper logical channels.

The HARQ processor 1910 corresponds to a set of soft buffers configured to perform an HARQ operation and is identified by an HARQ process identifier.

The transmission/reception unit 1915 transmits or receives a MAC PDU or control information through a wireless channel.

The contention based uplink grant controller 1920 determines whether to generate a contention based uplink grant in consideration of an uplink transmission resource situation. Further, in consideration of the number of potential contention based access UEs transferred from the UE context management unit 1930, the contention based uplink grant controller 1920 determines a contention based access allowance probability parameter and a contention based access allowance logical channel priority parameter and then transfers them to the scheduler 1925.

The scheduler 1925 determines the transmission resource to be allocated and the UE to which the transmission resource is to be allocated, in consideration of the priority and the quantity of the reported uplink data, and the channel situation of the UE, generates an uplink grant based on the determination, and transfers the generated uplink grant. Further, the scheduler 1925 controls the transmission/reception unit 1915, so as to receive and decode an uplink transmission based on the uplink grant. Further, the scheduler 1925 reports an uplink transmission resource, which remains after being allocated, to the contention based uplink grant controller 1920.

The UE context management unit 1930 is an apparatus for managing information on UEs operating in a connected state within a cell. The information managed by the UE context management unit 1930 includes, for example, a UE identifier, information on whether a discontinuous reception has been set for each UE, and an active time. When the contention based uplink grant controller 1920 requests for the number of potential contention based access UEs of a particular subframe, the UE context management unit 1930 obtains the number of potential contention based access UEs by referring to the discontinuous reception setting of the UEs, etc., and reports the obtained number of UEs to the contention based uplink grant controller 1920.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method of performing a contention based access in a User Equipment (UE) of a mobile communication system, the method comprising:
    triggering, by a control unit, a Buffer Status Report (BSR) to an Enhanced Node B (ENB) when data to be transmitted to the ENB occurs;
    triggering, by the control unit, the contention based access when the BSR has been triggered; and
    if an uplink grant for an uplink transmission from the ENB is received, performing the uplink transmission by using the received uplink grant,
    wherein the uplink grant includes information indicating an access allowance probability and an access allowance logical channel priority to be applied to the contention based access.

2. The method of claim 1, wherein if a scheduling request (SR) has been transmitted to the ENB or if the SR has been canceled after the contention based access has been triggered, or if the triggered BSR has been canceled, cancelling, by the control unit, the triggered contention based access.

3. The method of claim 1, wherein the information to be applied to the contention based access is located in predetermined fields of the uplink grant, and the predetermined fields includes at least one of a flag indicating downlink grant/uplink grant, a hopping flag indicating whether to perform a hopping at a time of uplink retransmission, a field necessary for Hybrid Automatic Repeat Request (HARQ) retransmission, a field indicating increase/decrease of an uplink transmission output of the UE, and a field indicates reporting of channel status together with an uplink transmission.

4. The method of claim 1, wherein if the received uplink grant indicates uplink grant for the a contention based access, determining, by the control unit, if a timer for prohibiting a contention based uplink transmission is operating,
    if the timer is not operating, performing the uplink transmission, and
    after performing the uplink transmission, operating the timer.

5. The method of claim 1, wherein if a scheduling request (SR) triggered, and if the UE is not allocated a transmission resource for the SR, cancelling, by the control unit, the SR; and
    determining, by the control unit, if a contention based access preamble has been transmitted; and
    if contention based access preamble has been transmitted, canceling, by the control unit, the triggered contention based access,
    wherein if the BSR is triggered, the SR is triggered.

6. The method of claim 1, further comprising:
    before a Scheduling Request (SR) is transmitted to the ENB, determining, by the control unit, if each sub-frame is included in an active time during a discontinuous reception; and
    before the SR is transmitted to the ENB performing, by the control unit, monitoring to determine if a contention based uplink grant for an uplink transmission is received through a control channel of a corresponding sub-frame when the corresponding sub-frame is included in the active time.

7. The method of claim 6, further comprising:
    before the Scheduling Request (SR) is transmitted to the ENB performing, by the control unit, monitoring to determine if contention based access has been triggered and is not cancelled when the corresponding sub-frame is not included in the active time.

8. The method of claim 1, wherein the step of performing the uplink transmission by using the received uplink grant comprises:
    if the received uplink grant indicates a uplink grant for the contention based access, determining, by the control unit, if a sub-frame for the uplink transmission using the uplink grant is allocated by using a Semi Persistent Scheduling resource; and
    if the sub-frame is allocated by using the Semi Persistent Scheduling resource, discarding, by the control unit, the uplink grant, and stopping execution of the uplink transmission by using the received uplink grant.

9. The method of claim 1, wherein performing the uplink transmission by using the received uplink grant comprises:
    if the received uplink grant indicates a uplink grant for the contention based access, determining if a sub-frame for the uplink transmission using the uplink grant is allocated by using a semi persistent scheduling resource; and
    if the sub-frame is allocated by using the Semi Persistent Scheduling resource, discarding the uplink grant and stop execution of the uplink transmission by using the uplink grant; and
    when the uplink transmission by the contention based uplink grant will not be performed at a same sub-frame, performing the uplink transmission by the contention based uplink grant.

10. A UE configured to perform a contention based access in a UE of a mobile communication system, the UE comprising:
    a transmission/reception unit configured to transmit and receive data to and from an Enhanced Node B (ENB);
    a control unit configured to trigger a Buffer Status Report (BSR) to an Enhanced Node B (ENB) when data to be transmitted to the ENB occurs, and trigger the contention based access when the BSR has been triggered, and if an uplink grant for an uplink transmission from the ENB is received, perform the uplink transmission by using the received uplink grant,
    wherein the uplink grant includes information indicating an access allowance probability and an access allowance logical channel priority to be applied to the contention based access.

11. The UE of claim 10, wherein the control unit is configured to cancel the triggered contention based access if a the scheduling request (SR) has been transmitted to the ENB or if the SR has been canceled or after the contention based access has been triggered, when the triggered BSR has been canceled.

12. The UE of claim 10, wherein the control unit is configured to:
    before a Scheduling Request (SR) is transmitted to the ENB, determine if each sub-frame is included in an active time during a discontinuous reception, and before the SR is transmitted to the ENB performing, monitor to determine if a contention based uplink grant for an uplink transmission is received through a control channel of a corresponding sub-frame if the corresponding sub-frame is included in the active time.

13. The UE of claim 12, wherein, when a corresponding sub-frame is not included in the active time, perform monitoring to determine contention based access has been triggered and is not cancelled.

14. The UE of claim 10, wherein if the received uplink grant indicates a uplink grant for the contention based access, the control unit is configured to determine if a sub-frame for the uplink transmission using the uplink grant is allocated by a semi persistent scheduling resource if the sub-frame is allocated by using the semi persistent scheduling resource, discard the uplink grant, stop execution of the uplink transmission by using the uplink grant.

15. The UE of claim 10, wherein the control unit is configured to:
   if a scheduling request (SR) is triggered and if the UE is not allocated a transmission resource for the SR, cancel the SR, and determine if a contention based access preamble has been transmitted; and if the contention based access preamble has been transmitted, cancel the triggered contention based access,
   wherein if the BSR is triggered, the SR is triggered.

16. The UE of claim 10, wherein the control unit is configured to:
   if the received uplink grant indicates a uplink grant for the contention based access, determine if a sub-frame for the uplink transmission using the uplink grant is allocated by using a semi persistent scheduling resource; and
   if the sub-frame is allocated by using the Semi Persistent Scheduling resource, discard the uplink grant and stop execution of the uplink transmission by using the uplink grant; and
   when the uplink transmission by the contention based uplink grant will not be performed at a same sub-frame, performing the uplink transmission by the contention based uplink grant.

17. The UE of claim 10, wherein the information to be applied to the contention based access is located in predetermined fields of the uplink grant, and the predetermined fields includes at least one of a flag indicating downlink grant/uplink grant, a hopping flag indicating whether to perform a hopping at a time of uplink retransmission, a field necessary for Hybrid Automatic Repeat Request (HARQ) retransmission, a field indicating increase/decrease of an uplink transmission output of the UE, and a field indicates reporting of channel status together with an uplink transmission.

18. The UE of claim 10, wherein if the received uplink grant indicates uplink grant for the a contention based access, the control unit is configured to determine if a timer for prohibiting a contention based uplink transmission is operating, if the timer is not operating, perform the uplink transmission, and after perform the uplink transmission, operate the timer.

* * * * *